United States Patent
Liao et al.

(10) Patent No.: US 12,077,667 B2
(45) Date of Patent: Sep. 3, 2024

(54) RESIN COMPOSITION

(71) Applicant: NAN YA PLASTICS CORPORATION, Taipei (TW)

(72) Inventors: Te-Chao Liao, Taipei (TW); Chien Kai Wei, Taipei (TW); Hung-Yi Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/870,818

(22) Filed: Jul. 21, 2022

(65) Prior Publication Data
US 2023/0167298 A1  Jun. 1, 2023

(30) Foreign Application Priority Data
Nov. 26, 2021 (TW) .................................. 110144102

(51) Int. Cl.
*C08L 75/04* (2006.01)
*C08L 45/00* (2006.01)

(52) U.S. Cl.
CPC .............. *C08L 75/04* (2013.01); *C08L 45/00* (2013.01); *C08L 2201/02* (2013.01); *C08L 2205/035* (2013.01); *C08L 2312/00* (2013.01)

(58) Field of Classification Search
CPC ...... C08L 75/04; C08L 45/00; C08L 2201/02; C08L 2205/035; C08L 2312/00; C08L 71/12
See application file for complete search history.

(56) References Cited

U.S. PATENT DOCUMENTS

| | | | |
|---|---|---|---|
| 10,093,800 B2 | 10/2018 | Zeng | |
| 2020/0263022 A1 | 8/2020 | Hsu | |
| 2022/0275122 A1* | 9/2022 | Koda | ....................... C08J 5/249 |

FOREIGN PATENT DOCUMENTS

| | | | | |
|---|---|---|---|---|
| CN | 102838864 | | 12/2012 | |
| CN | 104177809 | | 12/2014 | |
| CN | 104559055 | | 4/2015 | |
| CN | 107201036 | A * | 9/2017 | .............. C08L 79/04 |
| CN | 109971154 | | 7/2019 | |
| CN | 112204105 | | 1/2021 | |
| CN | 112313281 | | 2/2021 | |
| JP | 2004035858 | | 2/2004 | |
| JP | 2010138364 | | 6/2010 | |
| JP | 2018028105 | | 2/2018 | |
| TW | 202112846 | | 4/2021 | |
| WO | 2018139368 | | 8/2018 | |
| WO | 2019230945 | | 12/2019 | |

OTHER PUBLICATIONS

English Machine Translation of CN102838864 A originally published to Dai et al. on Dec. 26, 2012, obtained on Jun. 5, 2023 from https://worldwide.espacenet.com/publicationDetails/biblio?DB=EPODOC&II=0&ND=3&adjacent=true&locale=en_EP&FT=D&date=20121226&CC=CN&NR=102838864A&KC=A# (Year: 2012).*
https://cymitquimica.com/products/02-045810/7631-86-9/silica-gel-hplc-grade-spherical-5-micron-aps-120-angstroms/ Silica gel, HPLC grade, spherical, 99.99+%, Thermo Scientific Chemicals, CAS: 7631-86-9. (Year: 2023).*
English Machine Translation of CN 107201036 ( A ) obtained on Dec. 27, 2023 from https://worldwide.espacenet.com/publicationDetails/biblio?CC=CN&NR=107201036A&KC=A&FT=D&ND=3&date=20170926&DB=&locale=en_EP (Year: 2017).*
https://cymitquimica.com/products/02-045810/7631-86-9/silica-gel-hplc-grade-spherical-5-micron-aps-120-angstroms/ Silica gel, HPLC grade, spherical, 99.99+%, Thermo Scientific Chemicals, CAS: 7631-86-9. (Year: 2023) (Year: 2023).*
"Office Action of Taiwan Counterpart Application", issued on Dec. 7, 2022, p. 1-p. 7
Admatechs Co., Ltd, "Admatechs Technical Overview", Dec. 6, 2016, pp. 1-2.
"Office Action of Japan Counterpart Application", issued on Oct. 31, 2023, p. 1-p. 4.
"Office Action of China Counterpart Application", issued on Jun. 13, 2024, p. 1-p. 7.

* cited by examiner

Primary Examiner — Ling Siu Choi
Assistant Examiner — Olga Lucia Donahue
(74) Attorney, Agent, or Firm — JCIPRNET

(57) ABSTRACT

A resin composition includes resin and inorganic filler. The resin includes CE resin and BMI resin, and a purity of the inorganic filler is at least greater than 99%.

9 Claims, No Drawings

RESIN COMPOSITION

CROSS-REFERENCE TO RELATED APPLICATION

This application claims the priority benefit of Taiwan application serial no. 110144102, filed on Nov. 26, 2021. The entirety of the above-mentioned patent application is hereby incorporated by reference herein and made a part of this specification.

BACKGROUND

Technical Field

The disclosure relates to a composition, and particularly relates to a resin composition.

Description of Related Art

Compositions of thermosetting resin are widely used in electronic equipment and other fields for having a crosslinking structure and exhibiting high heat resistance or dimensional stability. Furthermore, cyanate ester (CE) resin used in the thermosetting resin has characteristics such as flame retardancy and high glass transition temperature (Tg). However, due to reactivity, a substrate made of the resin does not have good heat resistance and electrical performance. In addition, as 5G system on telecommunications and millimeter wave (mmWave) communication systems advance in recent years, the application of mobile phones, base stations, servers, and so on requires the higher frequency (e.g. 6-77 GHz). Therefore, it is necessary to design a substrate material that is more applicable to the 5G high frequency.

SUMMARY

The disclosure is directed to a resin composition capable of serving as a 5G high-frequency substrate material and maintaining favorable electrical performance of a substrate made of the resin composition and reducing a coefficient of thermal expansion at the same time.

A resin composition of the disclosure includes resin and inorganic filler. The resin includes cyanate ester resin and bismaleimide resin, and a purity of the inorganic filler is at least greater than 99%.

In an embodiment of the disclosure, the inorganic filler is spherical $SiO_2$.

In an embodiment of the disclosure, an average particle size of the inorganic filler is 0.3 μm to 5 μm.

In an embodiment of the disclosure, a median particle size (D50) of the inorganic filler is 0.5 μm to 2.3 μm, and a maximum particle size of the inorganic filler is 0.6 μm to 2.9 μm.

In an embodiment of the disclosure, relative to a total of 100 parts by weight of the resin, an amount of the inorganic filler used is 80 parts by weight to 180 parts by weight.

In an embodiment of the disclosure, a proportion of the cyanate ester resin in the resin is 10 wt % to 30 wt %, and a proportion of the bismaleimide resin in the resin is 20 wt % and 50 wt %.

In an embodiment of the disclosure, the resin further includes at least one selected from the following groups: liquid rubber resin, polyphenylene ether resin, and a crosslinking agent.

In an embodiment of the disclosure, a proportion of the liquid rubber resin used in the resin is 0 wt % to 20 wt %, a proportion of the polyphenylene ether resin used in the resin is 0 wt % to 30 wt %, and a proportion of the crosslinking agent used in the resin is 0 wt % to 20 wt %.

In an embodiment of the disclosure, the resin composition further includes at least one of a flame retardant, silane, a promoter, or a peroxide.

In an embodiment of the disclosure, relative to the total of 100 parts by weight of the resin, an amount of the flame retardant used is 5 parts by weight to 30 parts by weight.

Based on the above, the resin composition of the disclosure may be capable of reducing an electrical value by selecting the inorganic filler with the purity of at least greater than 99% and without any metal residue. In this way, the resin composition may serve as the 5G high-frequency substrate material and maintain the favorable electrical performance of the substrate made of the resin composition and reduce the coefficient of thermal expansion at the same time.

In order for the features and advantages of the disclosure to be more comprehensible, the following embodiments are cited and described in detail as follows.

DESCRIPTION OF THE EMBODIMENTS

In the embodiment, a resin composition includes resin. The resin includes cyanate ester resin and bismaleimide (BMI) resin. In addition, the resin composition of the embodiment includes inorganic filler with a purity of at least greater than 99%. An electrical value may be effectively reduced by selecting the inorganic filler with the purity of at least greater than 99% and without any metal residue. In this way, the resin composition may serve as a 5G high-frequency substrate material and maintain favorable electrical performance of a substrate made of the resin composition and reduce a coefficient of thermal expansion (CTE) at the same time. The electrical performance is, for example, a dielectric constant (Dk) ranging from 3.3 to 3.6 and a dissipation factor (DO ranging from 0.002 to 0.004; however, the disclosure is not limited thereto. Furthermore, the inorganic filler may also improve mechanical strength and dimensional stability of the resin composition after hardening. In an embodiment, a composition of the inorganic filler is spherical $SiO_2$. Compared with irregular $SiO_2$, it is relatively easy for the spherical $SiO_2$ to form and stack and effectively achieve the densest accumulation. In this way, the coefficient of thermal expansion may be effectively reduced; however, the disclosure is not limited thereto.

In an embodiment, an average particle size of the inorganic filler is 0.3 μm (micrometer) to 5 μm. In addition, a median particle size of the inorganic filler may be 0.5 μm to 2.3 μm, and a maximum particle size of the inorganic filler may be 0.6 μm to 2.9 μm. The maximum particle size only has to be greater than the median particle size. As a result, the resin composition of the embodiment may have a relatively narrow range of the particle size to increase arrangement density. In this way, the coefficient of thermal expansion may be effectively reduced; however, the disclosure is not limited thereto.

In an embodiment, relative to a total of 100 parts by weight of the resin, an amount of the inorganic filler used is 80 parts by weight to 180 parts by weight (e.g. 80 parts by weight, 85 parts by weight, 90 parts by weight, 100 parts by weight, 120 parts by weight, 140 parts by weight, 180 parts by weight, or any value in a range of 80 parts by weight to 180 parts by weight).

In an embodiment, a weight proportion of the cyanate ester resin in the resin is 10 wt % to 30 wt % (e.g. 10 wt %, 15 wt %, 20 wt %, 25 wt %, 30 wt %, or any value in a range of 10 wt % to 30 wt %), and a weight proportion of the bismaleimide resin in the resin is 20 wt % to 50 wt % (e.g. 20 wt %, 25 wt %, 30 wt %, 40 wt %, 50 wt %, or any value in a range of 20 wt % to 50 wt %).

In an embodiment, the cyanate ester resin may include one or more compound or polymer with cyanate ester groups. In an embodiment, the cyanate ester resin has an average number of two or more cyanate ester groups. In another embodiment, the cyanate ester resin is a symmetric structure, which means the cyanate ester resin may be represented by the following chemical formula: "NCO—R—OCN". For example, it may be bisphenol A cyanate ester, but the disclosure is not limited thereto.

In an embodiment, the bismaleimide resin may use bisphenol A as a main structure, end-capped with maleimide and grafted with an alkyl group having 1 to 5 carbon atoms on the main structure of bisphenol A. Specifically, the structure of the bismaleimide resin is represented by the following structural formula, in which each of Ra, Rb, Rc, and Rd is an alkyl group having 1 to 5 carbon atoms. Preferably, each of Ra, Rb, Rc, and Rd is an alkyl group having 1 to 3 carbon atoms. In another embodiment, Ra and Rc are methyl groups, while Rb and Rd are ethyl groups, but the disclosure is not limited thereto.

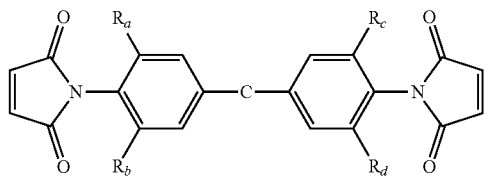

In an embodiment, the resin may further include one or more of polyphenylene ether resin, a crosslinking agent, and liquid rubber resin. A weight proportion of the polyphenylene ether resin in the resin is 0 wt % to 30 wt % (e.g. 0 wt %, 5 wt %, 10 wt %, 15 wt %, 20 wt %, 25 wt %, 30 wt %, or any value in a range of 0 wt % to 30 wt %), a weight proportion of the crosslinking agent in the resin is 0 wt % to 20 wt % (e.g. 0 wt %, 5 wt %, 10 wt %, 15 wt %, 20 wt %, or any value in a range of 0 wt % to 20 wt %), and a weight proportion of the liquid rubber resin in the resin is 0 wt % to 20 wt % (e.g. 0 wt %, 5 wt %, 10 wt %, 15 wt %, 20 wt %, or any value in a range of 0 wt % to 20 wt %).

In an embodiment, the liquid rubber resin may be polybutadiene and may have the following structure, where n=15 to 25, and preferably n=16 to 22:

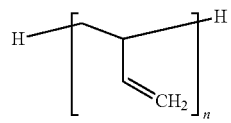

In an embodiment, the liquid rubber resin may be polyolefin and includes, but is not limited to: styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene copolymer, polybutadiene (homopolymer of butadiene), maleic anhydride-styrene-butadiene copolymer, methyl styrene copolymer, or a group formed by a combination thereof.

In an embodiment, the liquid rubber resin has 10 mol % to 90 mol % 1,2-vinyl and 0 mol % to 50 mol % styrene, and a molecular weight may be 1000 to 5000 to effectively crosslink with other resins and improve compatibility; however, the disclosure is not limited thereto.

In an embodiment, the polyphenylene ether resin is thermosetting polyphenylene ether resin and is a composition with terminal groups having styrene-type polyphenylene ether and terminal acrylic polyphenylene ether. For example, a structure of the styrene-type polyphenylene ether is shown in Formula (A):

Formula (A)

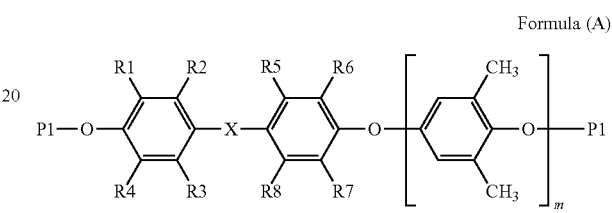

In Formula (A), R1 to R8 may be a hydrogen atom, an allyl group, a C1 to C6 alkyl group, or selected from one or more of the above groups, and two of R1 to R8 may be the same or different; X may be: a single bond, 0 (oxygen atom), or the following linking groups:

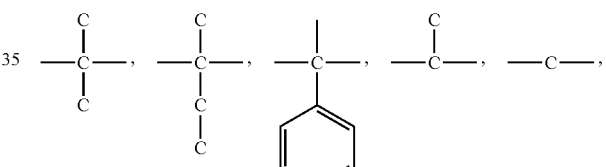

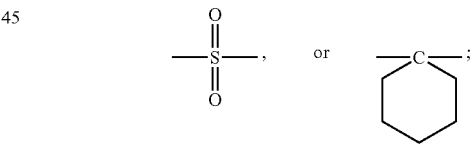

P1 may be styryl

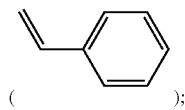

m may be an integer from 1 to 99.

A structure having terminal acrylic polyphenylene ether is shown in Formula (B):

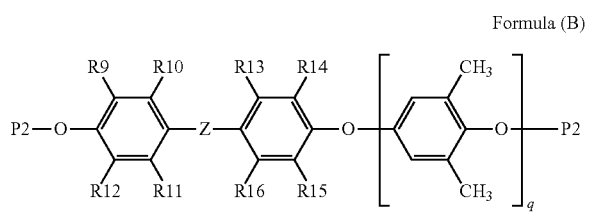

Formula (B)

In Formula (B), R9 to R16 may be a hydrogen atom, an allyl group, a C1 to C6 alkyl group, or selected from one or more of the above groups, and two of R9 to R16 may be the same

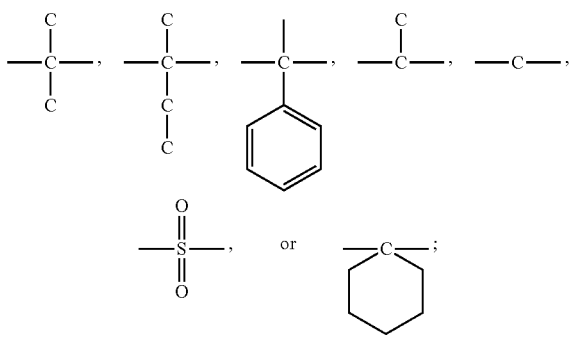

or different; Z may be: a single bond, 0 (oxygen atom), or the following linking groups:
P2 may be

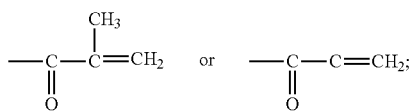

q may be an integer from 1 to 99.

Specific examples of the polyphenylene ether resin includes, but is not limited to, bishydroxy polyphenylene ether resin (e.g. SA-90 resin from Saudi Basic Industries Corporation, or SABIC), vinyl benzyl polyphenylene ether resin (e.g. OPE-2st resin from Mitsubishi Gas Chemical Company), methacrylate polyphenylene ether resin (e.g. SA-9000 resin from SABIC), vinyl benzyl modified bisphenol A polyphenylene ether resin, or vinyl chain-extended polyphenylene ether resin. The polyphenylene ether is preferably vinyl polyphenylene ether.

In an embodiment, the crosslinking agent is used to increase a degree of crosslinking of thermosetting resin, adjust rigidity and toughness of the substrate, and adjust processability. A type of the crosslinking agent used may be 1,3,5-triallyl cyanurate (TAC), triallyl isocyanurate (TAIL; CAS: 1025-15-6), trimethylallyl isocyanurate (TMAIC), diallyl phthalate, divinylbenzene, 1,2,4-triallyl trimellitate, etc., or a combination of one or more of the above.

In an embodiment, the resin composition further includes at least one of a flame retardant, silane, or a promoter. Relative to the total of 100 parts by weight of the resin, an amount of the flame retardant used is 5 parts by weight to 30 parts by weight (e.g. 5 parts by weight, 10 parts by weight, 20 parts by weight, 30 parts by weight, or any value in a range of 5 parts by weight to 30 parts by weight). Relative to the total of 100 parts by weight of the resin, an amount of the silane used is 0.1 parts by weight to 3 parts by weight (e.g. 0.1 parts by weight, 0.3 parts by weight, 0.5 parts by weight, 1 part by weight, 3 parts by weight, or any value in a range of 0.1 parts by weight to 3 parts by weight). Relative to the total of 100 parts by weight of the resin, an amount of the promoter used is 0.1 parts by weight to 2 parts by weight (e.g. 0.1 parts by weight, 0.3 parts by weight, 0.5 parts by weight, 1 part by weight, 2 parts by weight, or any value in a range of 0.1 parts by weight to 2 parts by weight). However, the disclosure is not limited thereto; the amounts above may be adjusted according to actual design requirements.

In an embodiment, the flame retardant may be a halogen-free flame retardant, and a specific example of the flame retardant may be a phosphorus flame retardant, which may be selected from phosphates, such as TPP, RDP, BPAPP, BBC, CR-733S, and PX-200; may be selected from phosphazenes such as SPB-100; ammonium polyphosphate, melamine polyphosphate (MPP), and melamine cyanurate; may be selected from more than one combinations of DOPO flame retardants, such as DOPO (e.g. the following Formula (C)), DOPO-HQ (e.g. the following Formula (D)), double DOPO derivative structure (e.g. the following Formula (E)), etc.; and aluminum-containing hypophosphites (e.g. the following Formula (F)).

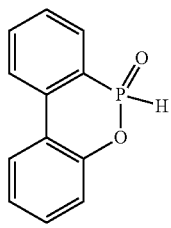

Formula (C)

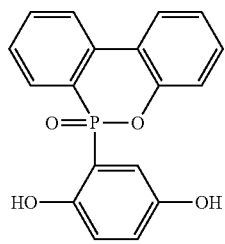

Formula (D)

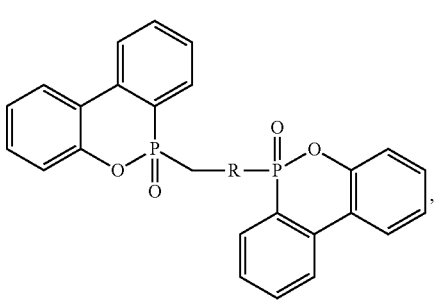

Formula (E)

in which R may be

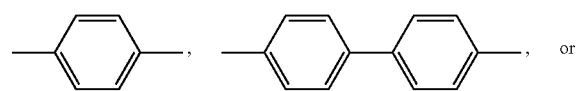

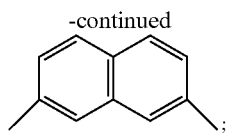

$(CH_2)_r$, r may be an integer from 1 to 4.

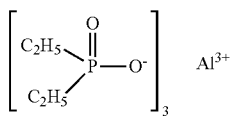

Formula (F)

In an embodiment, the silane may include, but is not limited to, siloxane. In addition, according to the type of functional groups, the silane may be divided into amino silane, epoxide silane, vinyl silane, ester silane, hydroxy silane, isocyanate silane, methylacryloxy silane, and acryloxy silane.

In an embodiment, to enhance system reactivity, the promoter may include a catalyst and peroxide. Specifically, the catalyst includes 1-cyanoethyl-2-phenylimidazole (2PZCN; CAS: 23996-12-5), 1-benzyl-2-phenylimidazole (1B2PZ; CAS: 37734-89-7), thiabendazole (TBZ; CAS: 7724-48-3), or a combination of the above. The imidazole that has the best improvement effect is, for example but not limited to, 1-benzyl-2-phenylimidazole. Other suitable catalyst may be selected according to actual design requirements.

In an embodiment, the peroxide may be tert-butyl cumyl peroxide, dicumyl peroxide (DCP), benzoyl peroxide (BPO), 2,5-dimethyl-2,5-di(tert-butylperoxy) hexane, 2,5-dimethyl-2,5-di(tert-butylperoxy) hexyne, 1,1-di-(tert-butylperoxy-3,3,5-trimethylcyclohexane, di(tert-butylperoxyisopropyl) benzene, Luf, but the disclosure is not limited to the above examples.

Note that the specific embodiments listed above are not a limitation of the disclosure, as long as the resin of the resin composition includes cyanate ester resin and bismaleimide resin and use the inorganic filler with the purity of at least greater than 99%, all are within the protection scope of the disclosure. In addition, in some of the above structure formulae or functional groups, the hydrogen on the carbon is omitted for clarity.

The following examples and comparative examples are listed to illustrate the effects of the disclosure, but the scope of rights of the disclosure is not limited to the scope of the examples.

The copper clad laminates manufactured in the respective examples and comparative examples were evaluated according to the following methods.

The glass transition temperature (° C.) was tested by a dynamic mechanical analyzer (DMA).

288° C. solder resistance and heat resistance (seconds): After the sample was heated in a pressure cooker at 120° C. and 2 atm for 120 minutes, the sample was immersed in a 288° C. solder furnace, and the time required for the sample to delaminate was recorded.

Dielectric constant Dk: The dielectric constant Dk at a frequency of 10 GHz was tested by the dielectric analyzer HP Agilent E4991A.

Dielectric loss Df: The dielectric loss Df at a frequency of 10 GHz was tested by the dielectric analyzer HP Agilent E4991A.

Peel strength of copper foil (lb/in): The peel strength between copper foil and a circuit carrier was tested.

Coefficient of thermal expansion: A 4.5 mm×30 mm×0.1 mm sample was used. The sample was heated at a heating rate of 10° C./min from 40° C. to 340° C. in a thermomechanical analyzer (manufactured by TA Instruments) to measure a linear coefficient of thermal expansion along a plane direction of 60° C. to 60° C. 50° C. to 120° C. A measuring direction is set to be a warp direction of a glass-fiber fabric of a laminate.

Examples 1 to 2, Comparative Example 1

The resin composition shown in Table 1 was mixed with toluene to form a varnish of thermosetting resin composition. The varnish was impregnated with Nan Ya fiberglass cloth (cloth type 2013 from Nan Ya Plastics Corporation) at room temperature. Then, after drying for several minutes at 130° C. (impregnator), a piece of prepreg with a resin content of 60 wt % was obtained. Finally, 4 pieces of the prepreg were stacked layer by layer between two layers of 35 μm thick copper foil. Under a pressure of 25 kg/cm² and a temperature of 85° C., a constant temperature was kept for 20 minutes. Then, after heating to 185° C. at a heating rate of 3° C./min, a constant temperature was kept again for 120 minutes. Then, slowly cool down to 130° C. to obtain a 0.5 mm thick copper clad laminate.

The physical properties of the manufactured copper clad laminate were tested, and the results are shown in Table 1. After comparing the results of Examples 1 to 2 and Comparative Example 1 in Table 1, the following conclusion can be drawn: Compared with Comparative Example 1, Examples 1 to 2 can maintain the favorable electrical performance of the substrate made of the resin composition and reduce the coefficient of thermal expansion at the same time. Here, a purity of the inorganic filler (EQ02410SDM) used of Example 1 in Table 1 is 99.92%, a median particle size thereof is 2.3 μm, and a maximum particle size thereof is 2.9 μm. A purity of the inorganic filler (EQ0610SDM) used of Example 2 is 99.93%, a median particle size thereof is 0.5 μm, and a maximum particle size thereof is 0.6 μm. A purity of the inorganic filler (SC2500) used of Comparative Example 1 is 98.9%, a median particle size thereof is 0.6 μm, and a maximum particle size thereof is 15 μm.

TABLE 1

| | | Example | | Comparative Example |
|---|---|---|---|---|
| Part by weight | | 1 | 2 | 1 |
| Resin (100 parts by mass in | Cyanate ester resin (BA230S) | 30 t % | 30 wt % | 30 wt % |
| | Bismaleimide resin (KI-70) | 30 wt % | 30 wt % | 30 wt % |
| | Polyphenylene ether resin (Sabic SA9000) | 20 wt % | 20 wt % | 20 wt % |

TABLE 1-continued

|  | Part by weight | Example 1 | Example 2 | Comparative Example 1 |
|---|---|---|---|---|
| total) | Crosslinking agent (TAIC) | 10 wt % | 10 wt % | 10 wt % |
|  | Liquid rubber resin (polybutadiene) | 10 wt % | 10 wt % | 10 wt % |
| Other additives (relative to 100 parts by mass of resin) | Flame retardant (mosaflam 858 from UFC Corporation) | 17.5 parts by weight | 17.5 parts by weight | — |
|  | Flame retardant (Exolit ® OP 935) |  |  | 8.6 parts by weight |
|  | Inorganic filler (SC2500) | — | — | 162.9 parts by weight |
|  | Inorganic filler (EQ02410SDM) | 131.3 parts by weight | — | — |
|  | Inorganic filler (EQ0610SDM) | — | 131.3 parts by weight | — |
|  | Promoter (1-benzyl-2-phenylimidazole) | 0.3 parts by weight | 0.3 parts by weight | 0.3 parts by weight |
|  | Promoter (Luf) | 0.3 parts by weight | 0.3 parts by weight | 0.3 parts by weight |
| Glass transition temperature (° C.) |  | 265 | 268 | 266.9 |
| Heat resistance |  | Pass | Pass | Pass |
| Electrical property (Dk/Df) |  | 3.45/0.0031 | 3.42/0.0032 | 3.56/0.0038 |
| Peel strength of copper foil (lb/in) |  | 4.4 | 4.5 | 4.2 |
| Coefficient of thermal expansion (ppm/° C.) |  | 9 | 9 | 13 |

In summary of the above, the resin composition of the disclosure may be capable of reducing the electrical value by selecting the inorganic filler with the purity of at least greater than 99% and without any metal residue. In this way, the resin composition may serve as the 5G high-frequency substrate material and maintain the favorable electrical performance of the substrate made of the resin composition and reduce the coefficient of thermal expansion at the same time.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A resin composition, comprising:
a resin composed of a cyanate ester resin, a bismaleimide resin, liquid rubber resin, polyphenylene ether resin, and a crosslinking agent, wherein the bismaleimide resin only has a following structural formula:

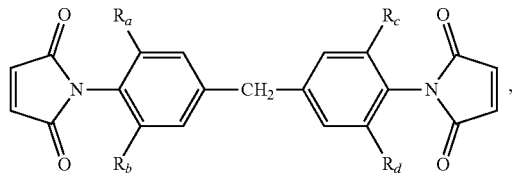

wherein each of Ra, Rb, Rc, and Rd is an alkyl group having 1 to 5 carbon atoms; and an inorganic filler, wherein a purity of the inorganic filler is at least greater than 99% and the inorganic filler has no metal residue.

2. The resin composition according to claim 1, wherein the inorganic filler is spherical $SiO_2$.

3. The resin composition according to claim 1, wherein an average particle size of the inorganic filler is 0.3 μm to 5 μm.

4. The resin composition according to claim 1, wherein a median particle size of the inorganic filler is 0.5 μm to 2.3 μm, and a maximum particle size of the inorganic filler is 0.6 μm to 2.9 μm.

5. The resin composition according to claim 1, wherein relative to a total of 100 parts by weight of the resin, an amount of the inorganic filler used is 80 parts by weight to 180 parts by weight.

6. The resin composition according to claim 1, wherein a proportion of the cyanate ester resin in the resin is 10 wt % to 30 wt %, and a proportion of the bismaleimide resin in the resin is 20 wt % to 50 wt %.

7. The resin composition according to claim 1, wherein a proportion of the liquid rubber resin used in the resin is 0 wt % to 20 wt % and not comprising 0 wt %, a proportion of the polyphenylene ether resin used in the resin is 0 wt % to 30 wt % and not comprising 0 wt %, and a proportion of the crosslinking agent used in the resin is 0 wt % to 20 wt % and not comprising 0 wt %.

8. The resin composition according to claim 1, wherein the resin composition further comprises at least one of a flame retardant, silane, or a promoter.

9. The resin composition according to claim 8, wherein relative to a total of 100 parts by weight of the resin, an amount of the flame retardant used is 5 parts by weight to 30 parts by weight.

* * * * *